(12) United States Patent
Kumar et al.

(10) Patent No.: US 11,902,292 B2
(45) Date of Patent: Feb. 13, 2024

(54) METHOD TO IMPROVE ANTI-MALWARE SCAN RESPONSIVENESS AND EFFECTIVENESS USING USER SYMPTOMS FEEDBACK

(71) Applicant: McAfee, LLC, San Jose, CA (US)

(72) Inventors: Ritesh Kumar, Santa Clara, CA (US); German Lancioni, Cordoba (AR)

(73) Assignee: MCAFEE, LLC, San Jose, CA (US)

( * ) Notice: Subject to any disclaimer, the term of this patent is extended or adjusted under 35 U.S.C. 154(b) by 328 days.

(21) Appl. No.: 17/039,520

(22) Filed: Sep. 30, 2020

(65) Prior Publication Data

US 2021/0014239 A1    Jan. 14, 2021

Related U.S. Application Data

(63) Continuation of application No. 15/392,867, filed on Dec. 28, 2016, now Pat. No. 10,826,914.

(51) Int. Cl.
| | | |
|---|---|---|
| *H04L 9/40* | (2022.01) | |
| *G06F 3/04847* | (2022.01) | |
| *G06F 16/28* | (2019.01) | |
| *G06F 21/55* | (2013.01) | |
| *G06F 21/56* | (2013.01) | |

(52) U.S. Cl.
CPC .......... *H04L 63/14* (2013.01); *G06F 3/04847* (2013.01); *G06F 16/285* (2019.01); *G06F 21/554* (2013.01); *G06F 21/56* (2013.01)

(58) Field of Classification Search
CPC ....... H04L 63/14; G06F 21/56; G06F 21/554; G06F 17/30598; G06F 3/0484–04847; G06F 3/0486; G06F 3/0488; G06F 16/285
See application file for complete search history.

(56) References Cited

U.S. PATENT DOCUMENTS

| | | |
|---|---|---|
| 5,621,879 A | 4/1997 | Kohda |
| 7,392,544 B1 | 6/2008 | Pavlyushchik |

(Continued)

OTHER PUBLICATIONS

Wikipedia Entry for "Antivirus Software", archived by the Internet Archive on Aug. 28, 2019, and retrieved on Aug. 24, 2023 at https://web.archive.org/web/20190828023046/https://en.wikipedia.org/wiki/Antivirus_software.*

(Continued)

*Primary Examiner* — Matthew T Henning
(74) *Attorney, Agent, or Firm* — Hanley, Flight & Zimmerman, LLC

(57) ABSTRACT

Methods, apparatus, systems and articles of manufacture are disclosed to improve anti-malware scan responsiveness, in response to a performance issue on a user computing device, determine a symptom associated with the performance issue based on a user input from the user computing device, the user input corresponding to highlighting an area of a display associated with the performance issue, a window having been rendered on the display by an operating system of the user computing device, identify a scan parameter for a targeted anti-malware scan based on positive results of malware scans from other user computing devices that experienced the symptom, and transmit the scan parameter to the user computing device to facilitate a targeted anti-malware scan of the user computing device based on the scan parameter.

19 Claims, 6 Drawing Sheets

(56) References Cited

U.S. PATENT DOCUMENTS

| | | | |
|---|---|---|---|
| 8,533,608 B1 | 9/2013 | Tantiprasut | |
| 8,904,538 B1 | 12/2014 | Glick et al. | |
| 10,162,693 B1 | 12/2018 | Contino et al. | |
| 10,826,914 B2 * | 11/2020 | Kumar | G06F 16/285 |
| 2002/0093525 A1 | 7/2002 | Asauchi | |
| 2002/0147506 A1 | 10/2002 | Eryurek et al. | |
| 2004/0267750 A1 | 12/2004 | Aaron | |
| 2005/0038697 A1 | 2/2005 | Aaron | |
| 2005/0038827 A1 | 2/2005 | Hooks | |
| 2008/0034060 A1 | 2/2008 | Fisher, Jr. | |
| 2008/0177994 A1 * | 7/2008 | Mayer | G06F 16/00 709/224 |
| 2010/0077008 A1 | 3/2010 | Davis et al. | |
| 2012/0041840 A1 | 2/2012 | Georgis et al. | |
| 2012/0084859 A1 | 4/2012 | Radinsky et al. | |
| 2013/0007527 A1 | 1/2013 | Petukhov et al. | |
| 2015/0067590 A1 | 3/2015 | Lee et al. | |
| 2015/0163233 A1 | 6/2015 | Liu | |
| 2016/0028749 A1 | 1/2016 | Murynets et al. | |
| 2016/0099960 A1 | 4/2016 | Gerritz et al. | |
| 2016/0239487 A1 | 8/2016 | Potharaju et al. | |
| 2017/0024228 A1 | 1/2017 | Chen et al. | |
| 2017/0206530 A1 | 7/2017 | Jang | |
| 2017/0269988 A1 | 9/2017 | Alfaro Bergueiro et al. | |
| 2017/0289179 A1 | 10/2017 | Dubuc et al. | |
| 2018/0137152 A1 | 5/2018 | Reichert et al. | |
| 2018/0183813 A1 | 6/2018 | Kumar et al. | |

OTHER PUBLICATIONS

International Searching Authority, "International Search Report and Written Opinion," issued in connection with International Application No. PCT/US2017/068644, dated Mar. 1, 2018, 12 pages.

United States Patent and Trademark Office, "Non-Final Office Action," issued in connection with U.S. Appl. No. 15/392,867, dated Sep. 30, 2019, 21 pages.

United States Patent and Trademark Office, "Final Office Action," issued in connection with U.S. Appl. No. 15/392,867, dated May 16, 2019, 20 pages.

United States Patent and Trademark Office, "Final Office Action," issued in connection with U.S. Appl. No. 15/392,867, dated Apr. 16, 2020, 8 pages.

United States Patent and Trademark Office, "Notice of Allowance," issued in connection with U.S. Appl. No. 15/392,867, dated Jul. 15, 2020, 9 pages.

United States Patent and Trademark Office, " Non-Final Office Action," issued in connection with U.S. Appl. No. 15/392,867, dated Oct. 5, 2018, 14 pages.

International Searching Authority, "International Preliminary Report on Patentability," issued in connection with International Application No. PCT/US2017/068644, dated Jul. 2, 2019, 8 pages.

* cited by examiner

METHOD TO IMPROVE ANTI-MALWARE SCAN RESPONSIVENESS AND EFFECTIVENESS USING USER SYMPTOMS FEEDBACK

RELATED APPLICATION

This patent arises from a continuation of U.S. patent application Ser. No. 15/392,867, (now U.S. Pat. No. 10,826, 914) which was filed on Dec. 28, 2016. U.S. patent application Ser. No. 15/392,867 is hereby incorporated by reference in its entirety. Priority to U.S. patent application Ser. No. 15/392,867 is hereby claimed.

TECHNICAL FIELD

Embodiments described herein generally relate to malware protection, and more specifically to improving the responsiveness of anti-malware scans using user symptom feedback.

BACKGROUND ART

Many types of anti-malware protection involve scanning a computer system when an issue is detected. Often, when a user detects a device is malfunctioning, the user may initiate an anti-malware scan. With personal computing devices increasing in storage size and other resources, scanning an entire system can take a long time, from several minutes to several hours. The longer the scan time is, the worse the user experience may be. A user may wait a very long time for an anti-malware scan to identify a problem, if a problem is found at all.

In some cases, a user may believe that a malfunctioning system is the result of the presence of malware in the system. In fact, the issue may be the result of a performance deterioration or a system error. Current remediation software does not include mechanisms to take into account user input or feedback regarding symptoms of a malfunction of a system.

DESCRIPTION OF EMBODIMENTS

Figure 1:
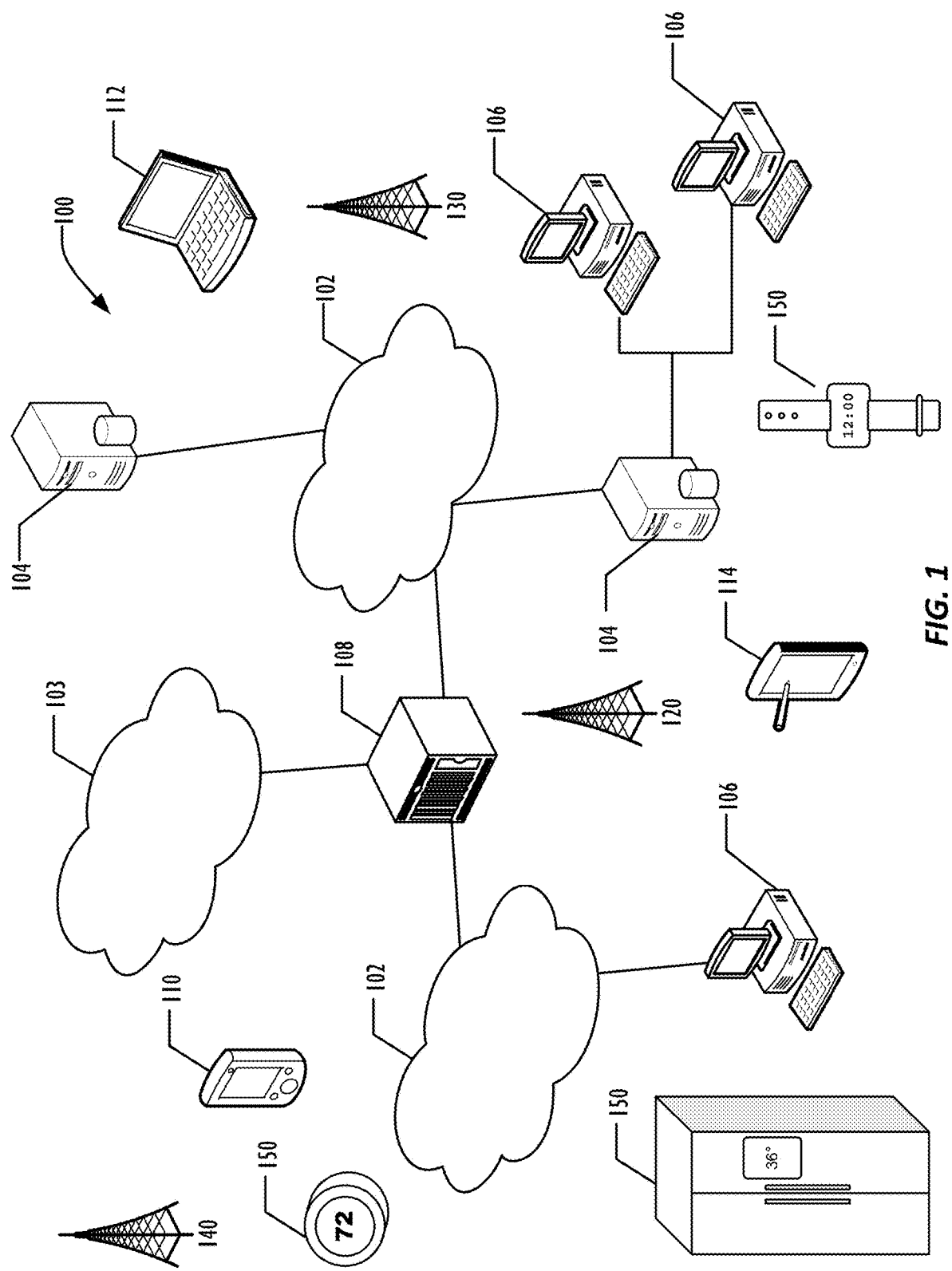
FIG. 1 is a diagram illustrating a network of programmable devices according to one or more embodiments.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "programmable device" can refer to a single programmable device or a plurality of programmable devices working together to perform the function described as being performed on or by the programmable device.

As used herein, the term "medium" refers to a single physical medium or a plurality of media that together store what is described as being stored on the medium.

As used herein, the term "network device" can refer to any programmable device that is capable of communicating with another programmable device across any type of network.

In one or more embodiments, a technique is provided for improving responsiveness and effectiveness of an anti-malware scan. The described system may provide a user interface that allows a user to describe symptoms prior to running a system scan in order to optimize the scan by focusing on the probable areas of the system or kind of malware associated with the user's description. In one or more embodiments, prior to deploying the scan, user input is solicited regarding a system malfunction. For example, a user interface may be provided which allows a user to enter text describing the malfunction, or otherwise provide input regarding the malfunction. Then, a targeted anti-malware scan may be generated. In one or more embodiments, a symptom parser engine may determine parameters for a targeted anti-malware scan that define particular files to be scanned, or particular functionality to be analyzed. According to one or more embodiments, the system may utilize a symptom analysis server to determine which parameters to select based on user feedback. As an example, the symptom analysis server may determine scan parameters based on successful scans from additional devices from similar user feedback. The targeted anti-malware scan may involve scanning less data than a full scan and, thus, may provide results more quickly and provide a more pleasant user experience. In addition, according to one or more embodiments, the system may provide a feedback loop between users utilizing the system to improve user feedback analysis.

Referring to the figures, FIG. 1 an example infrastructure 100 in which embodiments may be implemented is illustrated schematically. Infrastructure 100 contains computer networks 102. Computer networks 102 may include many different types of computer networks available today, such as the Internet, a corporate network, a Local Area Network (LAN), or a personal network, such as those over a Bluetooth connection. Each of these networks can contain wired or wireless programmable devices and operate using any number of network protocols (e.g., TCP/IP). Networks 102 may be connected to gateways and routers (represented by 108), end user computers 106, and computer servers 104. Infrastructure 100 also includes cellular network 103 for use with mobile communication devices. Mobile cellular networks support mobile phones and many other types of mobile devices. Mobile devices in the infrastructure 100 are illustrated as mobile phones 110, laptops 112, and tablets 114. A mobile device such as mobile phone 110 may interact with one or more mobile provider networks as the mobile device moves, typically interacting with a plurality of mobile network towers 120, 130, and 140 for connecting to the cellular network 103. Each of the networks 102 may contain a number of other devices typically referred to as Internet of Things (microcontrollers, embedded systems, industrial control computing modules, etc.) 150. Although referred to as a cellular network in FIG. 1, a mobile device may interact with towers of more than one provider network, as well as with multiple non-cellular devices such as wireless access points and routers 108. In addition, the mobile devices 110, 112, and 114 may interact with non-mobile devices such as computers 104 and 106 for desired services. The functionality of the gateway device 108 may be implemented in any device or combination of devices illustrated in FIG. 1; however, most commonly is implemented in a firewall or intrusion protection system in a gateway or router.

Figure 2:
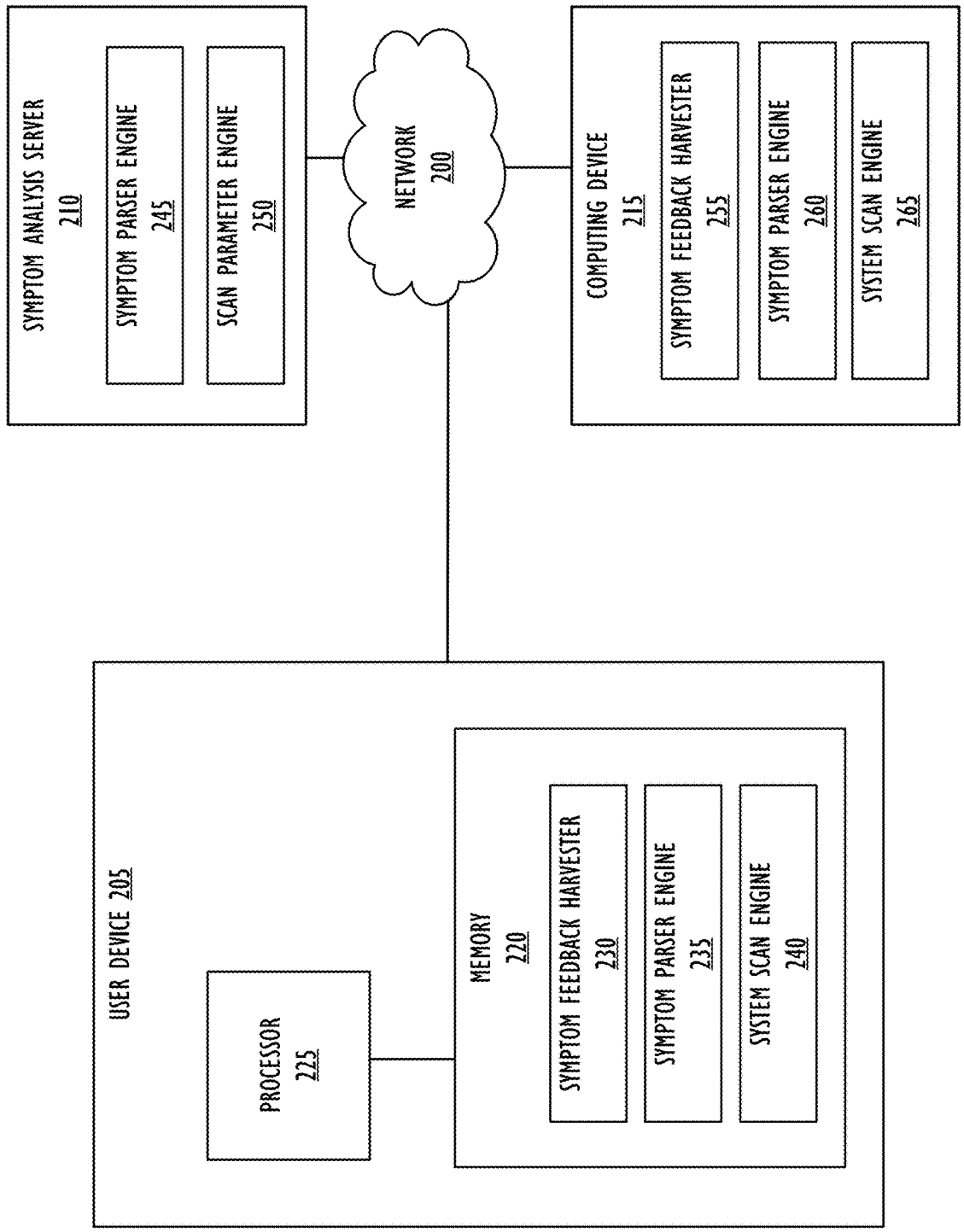
FIG. 2 is a diagram illustrating an example system for improving anti-malware scan responsiveness and effectiveness, according to one or more embodiments.

FIG. 2 is a diagram illustrating an example system for improving anti-malware scan responsiveness and effectiveness, according to one or more embodiments. FIG. 2 includes a user device 205. User device 205 may include, for example, a memory 220 and processor 225. Memory 220 may include a number of software or firmware modules executable by processor 225. In one or more embodiments, memory 220 may include a symptom feedback harvester 230. According to one or more embodiments, symptom feedback harvester may provide a user interface to a user of user device 205. In one or more embodiments, the symptom feedback harvester 230 may provide a user interface by which a user may provide feedback regarding a malfunction of the user device 205. In one or more embodiments, the user interface may be presented in response to detecting a malfunction of the user device 205, or in response to a user indicating that a malfunction has occurred on the user device 205. In one or more embodiments, the symptom feedback harvester 230 may allow any kind of user input. For example, the user interface may allow a user to input text describing the ongoing issue with the user device 205. Alternatively, or additionally, the symptom feedback harvester 230 may allow a user to select an area of a user interface, such as a particular window, in which an error has occurred. Further, other types of user input may be accepted through the user interface according to one or more embodiments, such as voice input.

The memory 220 may also include a symptom parser engine 235. In one or more embodiments, the symptom parser engine 235 may determine scan parameters by which a system scan should be targeted. In one or more embodiments, the symptom parser engine 235 may provide categorized flags to the system scan engine 240 in order to prioritize or reorganize a scan strategy based on most probable malware issues. For example, the categorized flags may be injected into an anti-malware or performance optimization software to focus and prioritize a system scan. The flags may, for example, identify categories or families of malware or other issues in a device. In one or more embodiments, prioritizing the scan strategy may result in reduced time required to complete the scan and find and address a problem causing the malfunction. According to one or more embodiments, the symptom parser engine 235 may analyze current processes interacting with a specified region of the screen or the specified description of the activity occurring on the user device 205. In the case of text or voice input, the symptom parser engine 235 may employ natural language analysis to detect a problem in the user device 205. The symptom parser engine 235 may utilize feature extraction and data analysis to determine symptoms corresponding to the user input. According to one or more embodiments, the symptom parser engine 235 may determine targeted anti-malware scan parameters based on the identified categorized flags.

Memory 220 may also include a system scan engine 240. In one or more embodiments, system scan engine 240 may provide a system scan, such as an anti-malware scan. The system scan engine 240 may be modified to run targeted anti-malware scans on the system, such as user device 205, based on the scan parameters. Thus, in one or more embodiments, the system scan engine 240 may be modified on demand to scan a subset of files on user device 205, or to reorganize a scan strategy to prioritize files or processes most likely to be problematic, based on categorized flags determined by symptom parser engine 235. That is, a portion of the functionality of a system scan may be deployed based on scan parameters, or a full scan may be deployed in a modified manner, based on a targeted anti-malware scan, to prioritize areas or functionality of interest as indicated by user input.

In one or more embodiments, the result of the modified targeted anti-malware scan, and details about the symptom analysis and targeted anti-malware scan, may be sent to a symptom analysis server 210 across a network 200. The symptom analysis server 210 may obtain analysis details and scan results from user device 205, as well as other network devices, such as computing device 215, which also employ one or more of symptom feedback harvester 255, symptom parser engine 260, and system scan engine 265. In one or more embodiments, symptom feedback harvester 255, symptom parser engine 260, and system scan engine 265 may include similar functionality to symptom feedback harvester 230 symptom parser engine 235, and system scan engine 240, as described above.

According to one or more embodiments, the symptom analysis server 210 may include a symptom parser engine 245 and a scan parameter engine 250. According to one or more embodiments, a situation may arise in which symptom parser engine 235 may not be able to identify scan parameters to deploy a targeted system scan. Thus, user device 205 may transmit the symptom feedback to the symptom analysis server 210 for further processing. As an example, the symptom analysis server 210 may determine a better match between user symptom feedback and scan parameters based on successful scan parameters collected from other systems, such as computing device 215. The symptom parser engine 245 may provide categorized flags to the system scan engine 240 in order to prioritize or reorganize a scan strategy based on most probable malware issues. The matches between user feedback and categorized flags or scan parameters may be managed and stored by scan parameter engine 250.

Figure 3:
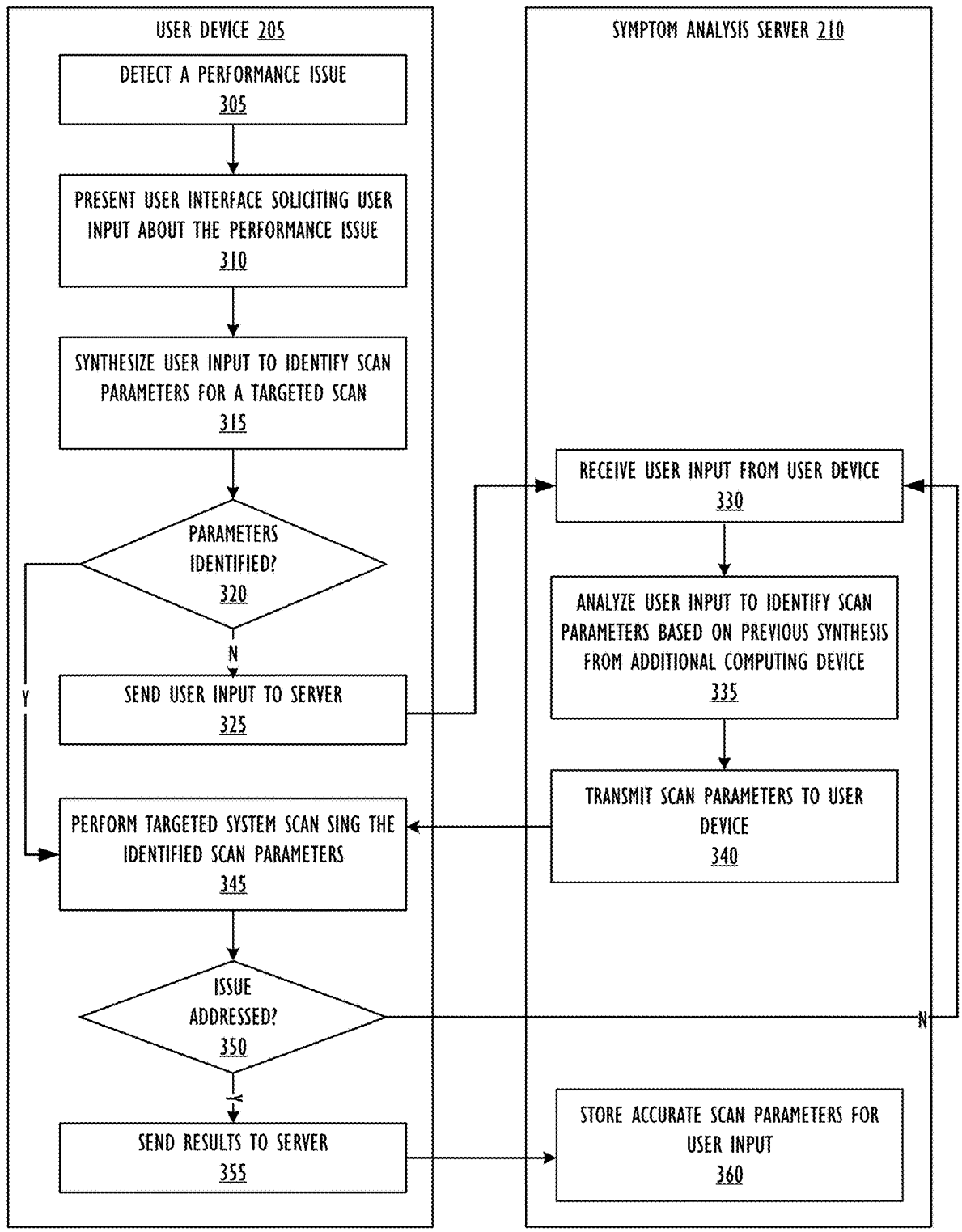
FIG. 3 is a flowchart illustrating a method for improving anti-malware scan responsiveness and effectiveness according to one or more embodiments.

FIG. 3 is a flowchart illustrating a method for improving anti-malware scan responsiveness and effectiveness according to one or more embodiments. The flowchart is depicted as occurring across user device 205 and symptom analysis server 210, however additional components may be used for the various processes. Further, the different processes may occur in a different order, by different components than those as described, or may be omitted all together, according to one or more embodiments.

The flowchart begins at 305 and a performance issue is detected. In one or more embodiments, the performance issue may be detected based on user input indicating that a malfunction has occurred. Further, according to one or more embodiments, a module, such as system scan engine 240 may monitor the user device 205 in the background and detect when a malfunction has occurred. In the case where the system scan engine monitors the user device 205, the system scan engine 240 may utilize a different technique than a full scan or a targeted anti-malware scan, as described below.

At 310, a user interface is presented soliciting user input about the performance issue or malfunction. In one or more embodiments, the user interface may display a text box that allows the user to enter textual information regarding the issue. As another example, the user interface may allow a user to select a window on a screen within which the issue is occurring or has occurred. For example, the user may click on a window, or select around an area of the screen in which the error was detected.

The flowchart continues at 315 and the user input is synthesized to identify scan parameters for a targeted anti-malware scan. As an example, if the user inputs text into a text box, the symptom parser engine 235 may utilize natural language analysis to determine what part of the system to scan. As an example, the user input may allow the symptom parser engine 235 to determine that system files should be scanned, or files for a particular application should be scanned. However, in one or more embodiments, the symptom parser engine 235 may not be able to identify scan parameters based on the user input. Thus, a determination is made at 320 regarding whether scan parameters have been identified. If, at 320, scan parameters are identified, then the flowchart continues at 345, and the system scan engine 240 performs the targeted anti-malware scan based on the identified scan parameters.

According to one or more embodiments, performing the targeted anti-malware scan results in a faster scan than a full system scan. Thus, a user is more likely to allow the scan to run long enough to identify and remediate a performance issue in the user device 205. The targeted anti-malware scan at 345 may be a scan limited to particular functionality or particular files of the user device 205. The flowchart continues at 350 and a determination is made if the issue is addressed. The determination may be made by the system scan engine 240 or may be determined based on input from the user. As an example, the user may be prompted to answer whether the performance issue has been addressed. If, at 350 it is determined that the performance issue has been addressed, then the flowchart continues at 355, and the positive results are sent to the symptom analysis server 210. The symptom analysis server 210 may collect results of targeted anti-malware scans based on user input in order to determine best scan parameters based on user input from other devices in a network at 360.

Returning to 320, if it is determined that parameters are not identified, then the user input is transmitted to symptom analysis server 210 in 325. The symptom analysis server 210 receives the user input at 330. The symptom analysis server 210 may provide support for additional user devices and thus may receive user input from additional users and use those results to provide better scan parameters based on user input. The flowchart continues at 335 and the symptom parser engine 245 analyzes the user input to identify scan parameters based on previous synthesis from additional computing devices. That is, in contrast to the symptom parser engine 235 of user device 205, the symptom parser engine 245 of symptom analysis server 210 has the benefit of collecting positive results of targeted anti-malware scans based on various user input from numerous devices. Thus, the scan parameters identified in 335 may be identified based on historic user input and scan results across a network, for example, by scan parameter engine 250. The flowchart continues at 340, where the symptom analysis server 210 transmits the identified scan parameters to the user device 205. The flowchart then proceeds as described above, beginning at 345.

Returning to 350, if it is determined that an issue is not addressed after a targeted anti-malware scan, then the user input may be transmitted for a first time, or retransmitted, to symptom analysis server 210. In one or more embodiments, the symptom analysis server may then determine scan parameters to be used. The flowchart may end either when a performance issue has been addressed, or after a specified amount of time, or number of iterations, of attempting targeted anti-malware scans. According to one or more embodiments, if the targeted anti-malware scan fails to address the performance issue, in one or more embodiments, the system scan engine 240 may perform a full scan of user device 205. Further, in one or more embodiments, if a solution is not found, the user input and results may be transmitted to a third party, such as a developer, to develop solutions to the issue identified by the user and not addressed by the system scan. The unaddressed issues may be collected and transmitted, for example, after a threshold is reached. For example, if a predetermined number of reports are received that include user input for which a solution is not found, then the combined user inputs may be transmitted to a third party.

Figure 4:
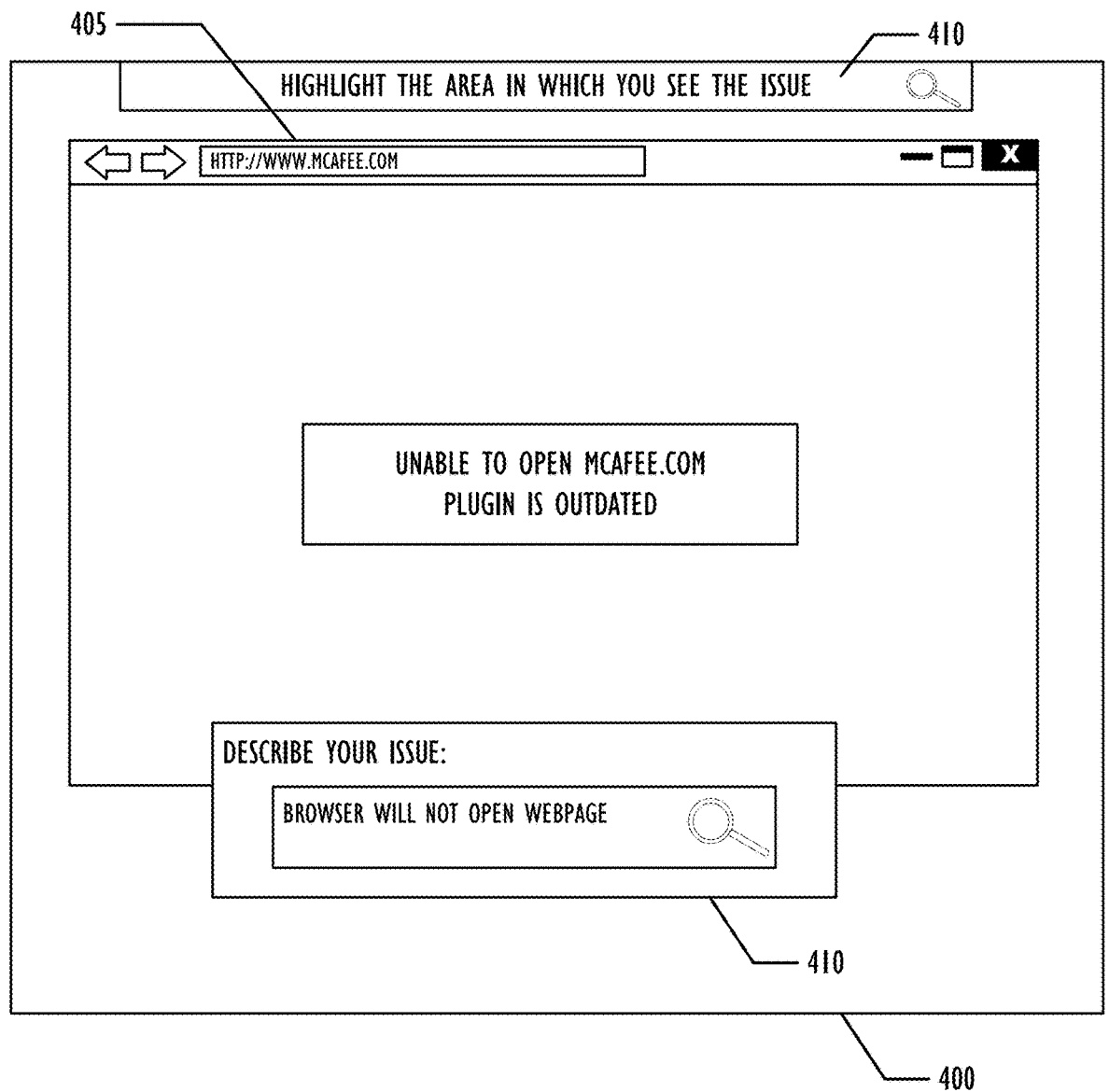
FIG. 4 is an example user interface for a technique for improving anti-malware scan responsiveness and effectiveness, according to one or more embodiments.

FIG. 4 is an example user interface for a technique for improving anti-malware scan responsiveness and effectiveness, according to one or more embodiments. The example depicts a display 400, which includes, for purposes of this example, a web browser window 405, which is not responding. In addition, the display depicts a prompt 410 that indicates to a user to highlight an area of the display in which the problem has occurred. The display may additionally, or alternatively, provide a text box, or other input object, which allows the user to describe a performance issue of the system. As shown in the example, a user has input "Browser will not open web page." By analyzing the user input, a system scan on the local device may determine how to perform a targeted anti-malware scan to identify issues with the browser. Alternatively, or additionally, the local device may transmit the user input to a remote server for analysis and receive scan parameters which can be used to perform a targeted anti-malware scan to address issues with the server.

Figure 5:
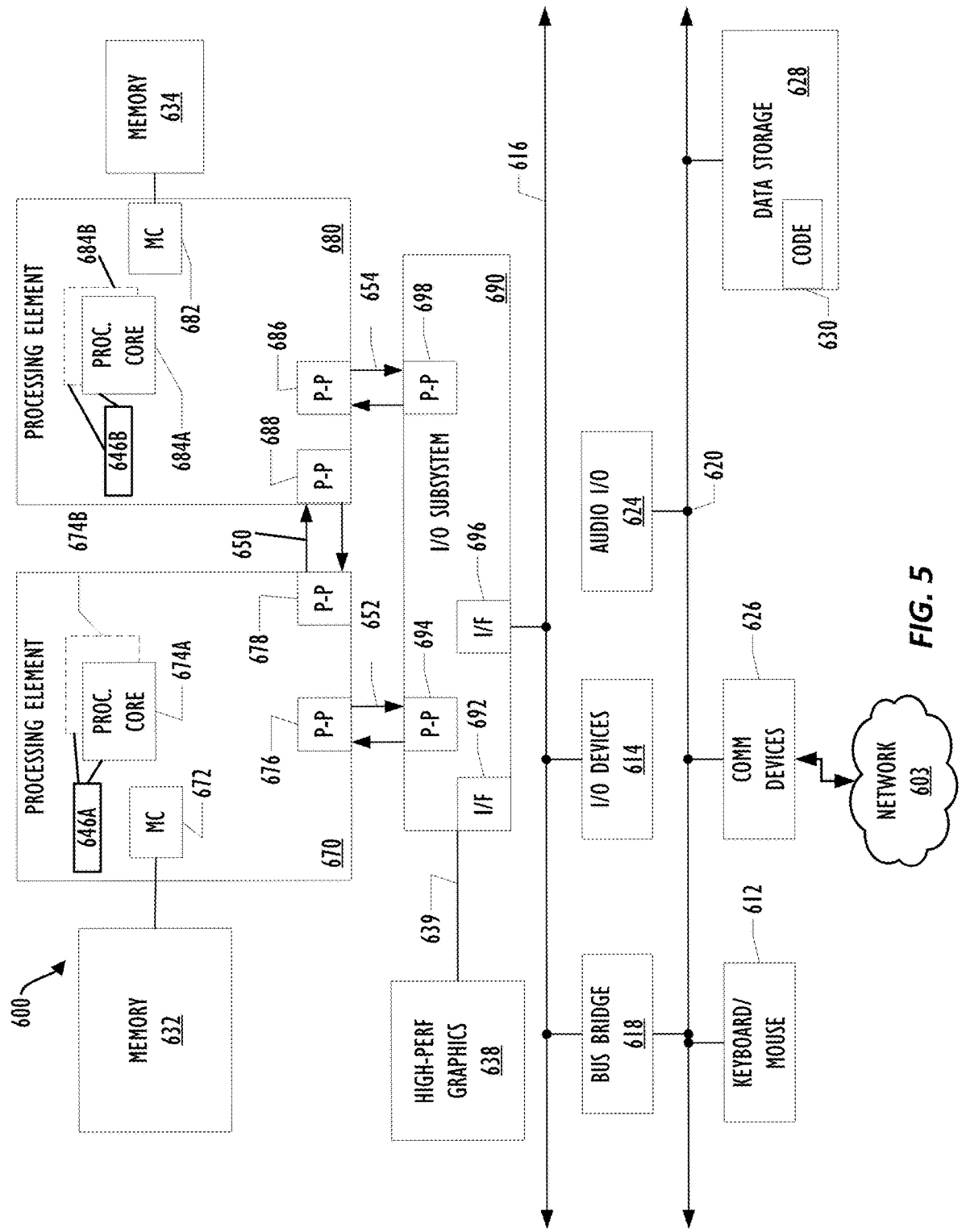
FIG. 5 is a diagram illustrating a computing device for use with techniques described herein according to one embodiment.

Referring now to FIG. 5, a block diagram illustrates a programmable device 600 that may be used within an IoT device, such as device 205, or device 210, in accordance with one or more embodiments. Devices 205 and 210 may not include all of the elements of FIG. 5. The programmable device 600 illustrated in FIG. 5 is a multiprocessor programmable device that includes a first processing element 670 and a second processing element 680. While two processing elements 670 and 680 are shown, an embodiment of programmable device 600 may also include only one such processing element.

Programmable device 600 is illustrated as a point-to-point interconnect system, in which the first processing element 670 and second processing element 680 are coupled via a point-to-point interconnect 650. Any or all of the interconnects illustrated in FIG. 5 may be implemented as a multi-drop bus rather than point-to-point interconnects.

As illustrated in FIG. 5, each of processing elements 670 and 680 may be multicore processors, including first and second processor cores (i.e., processor cores 674a and 674b and processor cores 684a and 684b). Such cores 674a, 674b, 684a, 684b may be configured to execute instruction code in a manner similar to that discussed above in connection with FIGS. 1-4. However, other embodiments may use processing elements that are single core processors as desired. In embodiments with multiple processing elements 670, 680, each processing element may be implemented with different numbers of cores as desired.

Each processing element 670, 680 may include at least one shared cache 646. The shared cache 646a, 646b may store data (e.g., instructions) that are utilized by one or more components of the processing element, such as the cores 674a, 674b and 684a, 684b, respectively. For example, the shared cache may locally cache data stored in a memory 632, 634 for faster access by components of the processing elements 670, 680. In one or more embodiments, the shared cache 646a, 646b may include one or more mid-level caches, such as level 2 (L2), level 3 (L3), level 4 (L4), or other levels of cache, a last level cache (LLC), or combinations thereof.

While FIG. 5 illustrates a programmable device with two processing elements 670, 680 for clarity of the drawing, the scope of the present invention is not so limited and any number of processing elements may be present. Alternatively, one or more of processing elements 670, 680 may be an element other than a processor, such as a graphics processing unit (GPU), a digital signal processing (DSP) unit, a field programmable gate array, or any other programmable processing element. Processing element 680 may be heterogeneous or asymmetric to processing element 670. There may be a variety of differences between processing elements 670, 680 in terms of a spectrum of metrics of merit including architectural, microarchitectural, thermal, power consumption characteristics, and the like. These differences may effectively manifest themselves as asymmetry and heterogeneity amongst processing elements 670, 680. In some embodiments, the various processing elements 670, 680 may reside in the same die package.

Figure 6:
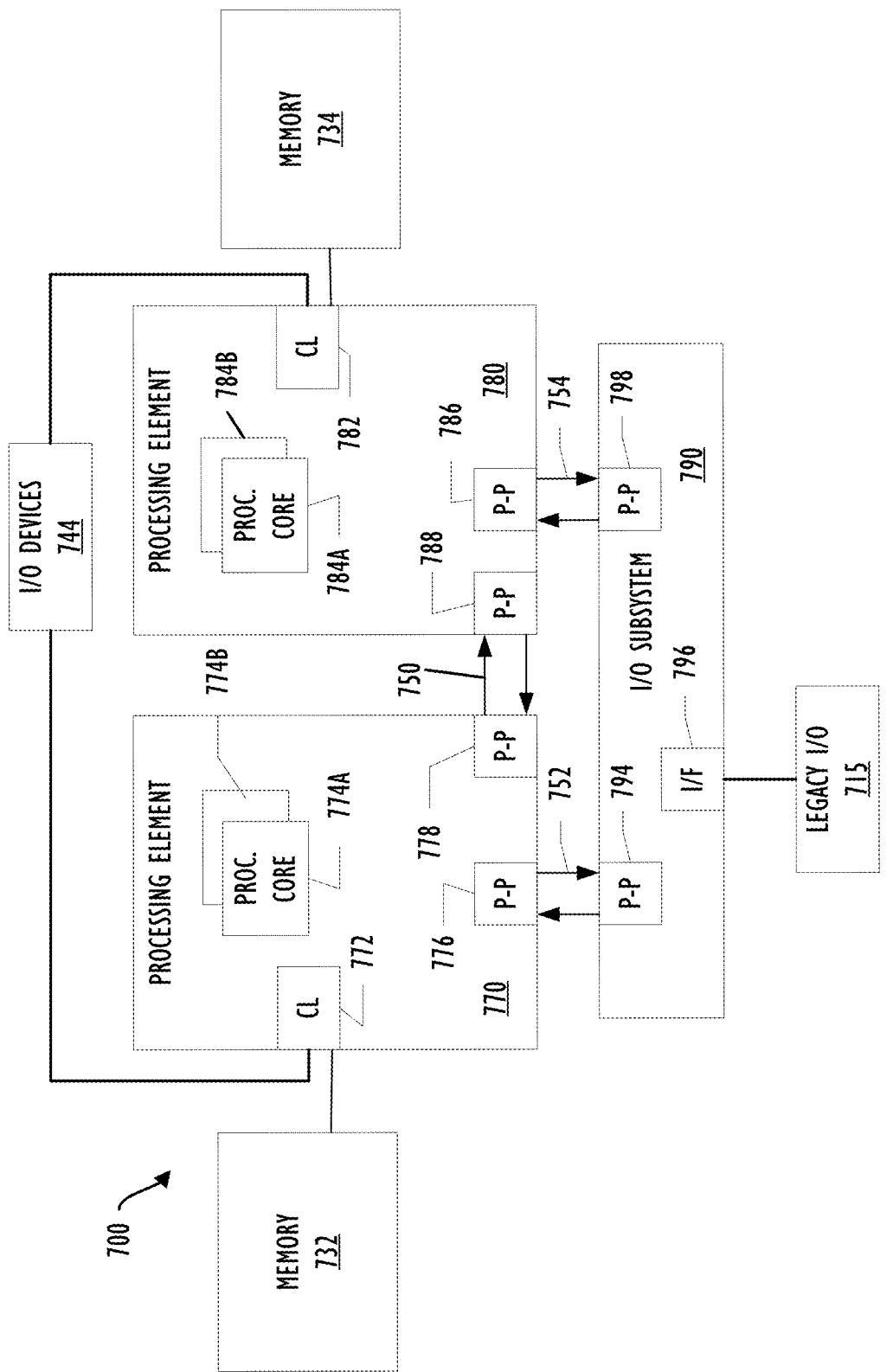
FIG. 6 is a block diagram illustrating a computing device for use with techniques described herein according to another embodiment.

First processing element 670 may further include memory controller logic (MC) 672 and point-to-point (P-P) interconnects 676 and 678. Similarly, second processing element 680 may include a MC 682 and P-P interconnects 686 and 688. As illustrated in FIG. 6, MCs 672 and 682 couple processing elements 670, 680 to respective memories, namely a memory 632 and a memory 634, which may be portions of main memory locally attached to the respective processors. While MC logic 672 and 682 is illustrated as integrated into processing elements 670, 680, in some embodiments the memory controller logic may be discrete logic outside processing elements 670, 680 rather than integrated therein.

Processing element 670 and processing element 680 may be coupled to an I/O subsystem 690 via respective P-P interconnects 676 and 686 through links 652 and 654. As illustrated in FIG. 6, I/O subsystem 690 includes P-P interconnects 694 and 698. Furthermore, I/O subsystem 690 includes an interface 692 to couple I/O subsystem 690 with a high performance graphics engine 638. In one embodiment, a bus (not shown) may be used to couple graphics engine 638 to I/O subsystem 690. Alternately, a point-to-point interconnect 639 may couple these components.

In turn, I/O subsystem 690 may be coupled to a first link 616 via an interface 696. In one embodiment, first link 616 may be a Peripheral Component Interconnect (PCI) bus, or a bus such as a PCI Express bus or another I/O interconnect bus, although the scope of the present invention is not so limited.

As illustrated in FIG. 5, various I/O devices 614, 624 may be coupled to first link 616, along with a bridge 618 which may couple first link 616 to a second link 620. In one embodiment, second link 620 may be a low pin count (LPC) bus. Various devices may be coupled to second link 620 including, for example, a keyboard/mouse 612, communication device(s) 626 (which may in turn be in communication with the computer network 603), and a data storage unit 628 such as a disk drive or other mass storage device which may include code 630, in one embodiment. The code 630 may include instructions for performing embodiments of one or more of the techniques described above. Further, an audio I/O 624 may be coupled to second bus 620.

Note that other embodiments are contemplated. For example, instead of the point-to-point architecture of FIG. 5, a system may implement a multi-drop bus or another such communication topology. Although links 616 and 620 are illustrated as busses in FIG. 5, any desired type of link may be used. Also, the elements of FIG. 5 may alternatively be partitioned using more or fewer integrated chips than illustrated in FIG. 5.

Referring now to FIG. 6, a block diagram illustrates a programmable device 700 according to another embodiment. Certain aspects of FIG. 5 have been omitted from FIG. 6 in order to avoid obscuring other aspects of FIG. 6.

FIG. 6 illustrates that processing elements 770, 780 may include integrated memory and I/O control logic ("CL") 772 and 782, respectively. In some embodiments, the 772, 782 may include memory control logic (MC) such as that described above in connection with FIG. 5. In addition, CL 772, 782 may also include I/O control logic. FIG. 6 illustrates that not only may the memories 732, 734 be coupled to the 772, 782, but also that I/O devices 744 may also be coupled to the control logic 772, 782. Legacy I/O devices 715 may be coupled to the I/O subsystem 790 by interface 796. Each processing element 770, 780 may include multiple processor cores, illustrated in FIG. 6 as processor cores 774A, 774B, 784A, and 784B. As illustrated in FIG. 6, I/O subsystem 790 includes P-P interconnects 794 and 798 that connect to P-P interconnects 776 and 786 of the processing elements 770 and 780 with links 752 and 754. Processing elements 770 and 780 may also be interconnected by link 750 and interconnects 778 and 788, respectively.

The programmable devices depicted in FIGS. 5 and 6 are schematic illustrations of embodiments of programmable devices which may be utilized to implement various embodiments discussed herein. Various components of the programmable devices depicted in FIGS. 6 and 7 may be combined in a system-on-a-chip (SoC) architecture.

It is to be understood that the various components of the flow diagrams described above, could occur in a different order or even concurrently. It should also be understood that various embodiments of the inventions may include all or just some of the components described above. Thus, the flow diagrams are provided for better understanding of the embodiments, but the specific ordering of the components of the flow diagrams are not intended to be limiting unless otherwise described so.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

The following examples pertain to further embodiments.

Example 1 is a machine readable medium on which instructions for improving anti-malware scan performance, comprising instructions that when executed cause one or more processors to: detect a performance issue on a computing device; present a user interface requesting user feedback regarding the performance issue; receive user input related to the performance issue; determine, based on the user input, a targeted anti-malware scan; and perform the targeted anti-malware scan on the computing device.

Example 2 is the machine readable medium of Example 1, wherein the instructions to cause the one or more processors to determine the targeted anti-malware scan further comprise instructions to cause the one or more processors to: synthesize the user input to determine one or more categories; and identify a portion of functionality of the anti-malware scan corresponding to the one or more categories.

Example 3 is the machine readable medium of Example 1, wherein the instructions to cause the one or more processors to determine the targeted anti-malware scan further comprise instructions to cause the one or more processors to: transmit, to a symptom analysis server, the user input; and receive, from the symptom analysis server, a portion of functionality of an anti-malware scan based on the user input.

Example 4 is the machine readable medium of Example 3, wherein the portion of functionality of the anti-malware scan is selected based on a previous synthesis of user input from a second device related to a second performance issue.

Example 5 is the machine readable medium of any of Examples 1-3, wherein the user interface comprises a prompt requesting symptomatic information regarding the performance issue.

Example 6 is the machine readable medium of any of Examples 1-3, wherein the instructions to determine the targeted anti-malware scan comprises instructions to determine a portion of data on the computing device to scan based on the user input.

Example 7 is the machine readable medium of Example 1, wherein the instructions to determine the targeted anti-malware scan comprises instructions to determine a portion of functionality of a scanning program based on the user input.

Example 8 is a system for improving anti-malware scan performance, comprising: one or more processors; and a memory coupled to the one or more processors and comprising instructions that when executed cause the one or more processors to: detect a performance issue on a computing device; present a user interface requesting user feedback regarding the performance issue; receive user input related to the performance issue; determine, based on the user input, a targeted anti-malware scan; and perform the targeted anti-malware scan on the computing device.

Example 9 is the system of Example 8, wherein the instructions to cause the one or more processors to determine the targeted anti-malware scan further comprise instructions to cause the one or more processors to: synthesize the user input to determine one or more categories; and identify a portion of functionality of the anti-malware scan corresponding to the one or more categories.

Example 10 is the system of Example 8, wherein the instructions to cause the one or more processors to determine the targeted anti-malware scan further comprise instructions to cause the one or more processors to: transmit, to a symptom analysis server, the user input; and receive, from the symptom analysis server, a portion of functionality of the anti-malware scan based on the user input.

Example 11 is the system of Example 10, wherein the portion of functionality of the anti-malware scan is selected based on a previous synthesis of user input from a second device related to a second performance issue.

Example 12 is the system of any of Examples 8-10, wherein the user interface comprises a prompt requesting symptomatic information regarding the performance issue.

Example 13 is the system of any of Examples 8-10, wherein the instructions to determine the targeted anti-malware scan comprises instructions to determine a portion of data on the computing device to scan based on the user input.

Example 14 is the system of Example 8, wherein the instructions to determine the targeted anti-malware scan comprises instructions to determine a portion of functionality of a scanning program based on the user input.

Example 15 is a method for improving anti-malware scan performance, comprising: detecting a performance issue on a computing device; presenting a user interface requesting user feedback regarding the performance issue; receiving user input related to the performance issue; determining, based on the user input, a targeted anti-malware scan; and performing the targeted anti-malware scan on the computing device.

Example 16 is the method of Example 15, wherein determining the targeted anti-malware scan further comprises: synthesizing the user input to determine one or more categories; and identifying a portion of functionality of the anti-malware scan corresponding to the one or more categories.

Example 17 is the method of Example 15, wherein determining the targeted anti-malware scan further comprises: transmitting, to a symptom analysis server, the user input; and receiving, from the symptom analysis server, a portion of functionality of the anti-malware scan based on the user input.

Example 18 is the method of Example 17, wherein the portion of functionality of the anti-malware scan is selected based on a previous synthesis of user input from a second device related to a second performance issue.

Example 19 is the method of any of Examples 15-17, wherein the user interface comprises a prompt requesting symptomatic information regarding the performance issue.

Example 20 is the method of any of Examples 15-17, wherein determining the targeted anti-malware scan comprises determining a portion of data on the computing device to scan based on the user input.

Example 21 is the method of Example 15, wherein determining the targeted anti-malware scan comprises determining a portion of functionality of a scanning program based on the user input.

Example 22 is a machine readable medium on which instructions for improving anti-malware scan performance, comprising instructions that when executed cause one or more processors to: receiving an indication of a performance issue on a computing device; receive user input related to the performance issue; identify scan parameters for a targeted anti-malware scan based on the user input; and transmit the scan parameters to the computing device for a targeted anti-malware scan of the computing device.

Example 23 is the machine readable medium of Example 22, wherein the instructions to identify scan parameters further comprise instructions to: determine a targeted functionality of the computing device based on a synthesis of previous user input related to a second performance issue on a second computing device.

Example 24 is the machine readable medium of any of Examples 22-23, wherein the scan parameters indicate a portion of files on the computing device to scan.

Example 25 is the machine readable medium of any of Examples 22-23, wherein the scan parameters define a scope of the computing device to scan.

Example 26 is an apparatus for improving anti-malware scan performance, comprising: means for detecting a performance issue on a computing device; means for presenting a user interface requesting user feedback regarding the performance issue; means for receiving user input related to the performance issue; means for determining, based on the user input, a targeted anti-malware scan; and means for performing the targeted anti-malware scan on the computing device.

Example 27 is the apparatus of Example 26, wherein the means for determining the targeted anti-malware scan further comprises: means for synthesizing the user input to determine one or more categories; and means for identifying a portion of functionality of the anti-malware scan corresponding to the one or more categories.

Example 28 is the apparatus of Example 26, wherein the means for determining the targeted anti-malware scan further comprises: means for transmitting, to a symptom analysis server, the user input; and means for receiving, from the symptom analysis server, a portion of functionality of an anti-malware scan based on the user input.

Example 29 is the apparatus of Example 28, wherein the portion of functionality of the anti-malware scan is selected based on a previous synthesis of user input from a second device related to a second performance issue.

Example 30 is the apparatus of any of Examples 26-28, wherein the user interface comprises a prompt requesting symptomatic information regarding the performance issue.

Example 31 is the apparatus of any of Examples 26-28, wherein the means for determining the targeted anti-malware scan comprises means for determining a portion of data on the computing device to scan based on the user input.

Example 32 is the apparatus of Example 26, wherein the means for determining the targeted anti-malware scan comprises means for determining a portion of functionality of a scanning program based on the user input.

Example 33 is an apparatus for improving anti-malware scan performance, comprising: means for receiving an indication of a performance issue on a computing device; means for receiving user input related to the performance issue; means for identifying scan parameters for a targeted anti-malware scan based on the user input; and means for transmitting the scan parameters to the computing device for a targeted anti-malware scan of the computing device.

Example 34 is the apparatus of Example 33, wherein the means for identifying scan parameters further comprises: means for determining a targeted functionality of the computing device based on a synthesis of previous user input related to a second performance issue on a second computing device.

Example 35 is the apparatus of any of Examples 33-34, wherein the scan parameters indicate a portion of files on the computing device to scan.

Example 36 is the apparatus of any of Examples 33-34, wherein the scan parameters define a scope of the computing device to scan.

It is to be understood that the above description is intended to be illustrative, and not restrictive. For example, the above-described embodiments may be used in combination with each other. As another example, the above-described flow diagrams include a series of actions which may not be performed in the particular order depicted in the drawings. Rather, the various actions may occur in a different order, or even simultaneously. Many other embodiment will be apparent to those of skill in the art upon reviewing the above description. The scope of the invention should therefore be determined with reference to the appended claims, along with the full scope of equivalents to which such claims are entitled.

What is claimed is:

1. A storage device or storage disk comprising instructions to cause processor circuitry to at least:
   in response to a performance issue on a user computing device, determine a symptom associated with the performance issue based on a user input from the user computing device, the user input corresponding to highlighting an area of a display associated with the performance issue, a window having been rendered on the display by an operating system of the user computing device;
   identify a portion of files on the user computing device for a targeted anti-malware scan based on positive results of malware scans from other user computing devices that experienced the symptom; and
   transmit a scan parameter corresponding to the portion of files to the user computing device to facilitate a targeted anti-malware scan of the user computing device based on the scan parameter.

2. The storage device or storage disk of claim 1, wherein the instructions cause the processor circuitry to transmit the user input or the symptom to a third party to determine a solution to the performance issue.

3. The storage device or storage disk of claim 2, wherein the instructions cause the processor circuitry to transmit the user input or the performance issue to the third party in response to a number of observed instances of the user input satisfying a threshold.

4. The storage device or storage disk of claim 1, wherein the instructions cause the processor circuitry to process results of the targeted anti-malware scan of the user computing device.

5. The storage device or storage disk of claim 1, wherein the performance issue is a first performance issue, the user computing device is a first user computing device, and the instructions cause the processor circuitry to obtain an indication of a second performance issue on a second user computing device.

6. The storage device or storage disk of claim 1, wherein the user input includes textual information.

7. The storage device or storage disk of claim 1, wherein the positive results of the malware scans from the other user computing devices are collected based on historic user input to the other user computing devices.

8. The storage device or storage disk of claim 1, wherein the processor circuitry is to identify, based on the positive results of the malware scans from the other user computing devices, a functionality of the user computing device to be analyzed.

9. A symptom analysis server comprising:
   interface circuitry;
   machine readable instructions; and
   programmable circuitry to at least one of instantiate or execute the machine readable instructions to:
   in response to a performance issue on a user computing device, determine a symptom associated with the performance issue based on a user input from the user computing device, the user input corresponding to highlighting of an area of a display associated with the performance issue, a window having been generated by an operating system of the user computing device;
   identify a portion of files on the user computing device for a targeted anti-malware scan based on positive results of malware scans from other user computing devices that experienced the symptom; and
   indicate the portion of files to the user computing device to facilitate a targeted anti-malware scan of the user computing device based on the portion of files.

10. The symptom analysis server of claim 9, wherein the programmable circuitry is to cause transmission of the user input or the symptom to a third party to determine a solution to the performance issue.

11. The symptom analysis server of claim 10, wherein the programmable circuitry is to cause transmission of the user input or the performance issue to the third party in response to a number of observed instances of the user input satisfying a threshold.

12. The symptom analysis server of claim 9, wherein the programmable circuitry is to process results of the targeted anti-malware scan of the user computing device.

13. The symptom analysis server of claim 9, wherein the performance issue is a first performance issue, the user computing device is a first user computing device, and the programmable circuitry is to obtain an indication of a second performance issue on a second user computing device.

14. The symptom analysis server of claim 9, wherein the user input includes textual information.

15. A method for improving anti-malware scan performance, the method comprising:
   determining a symptom associated with a performance issue on a user computing device based on a user input from the user computing device, the user input corresponding to a user highlighting an area of a display associated with the performance issue, a window associated with an operating system of the user computing device;
   identifying a portion of files on the user computing device for a targeted anti-malware scan based on positive results of malware scans from other user computing devices that experienced the symptom; and
   transmitting a scan parameter to indicate the portion of files to the user computing device to facilitate a targeted anti-malware scan of the user computing device based on the portion of files.

16. The method of claim 15, further including transmitting the user input or the symptom to a third party to determine a solution to the performance issue.

17. The method of claim 16, further including transmitting the user input or the performance issue to the third party in response to a number of observed instances of the user input satisfying a threshold.

18. The method of claim 15, further including processing results of the targeted anti-malware scan of the user computing device.

19. The method of claim 15, wherein the performance issue is a first performance issue, the user computing device is a first user computing device, and further including obtaining an indication of a second performance issue on a second user computing device.

* * * * *